United States Patent [19]

Herbst et al.

[11] Patent Number: 5,055,176
[45] Date of Patent: Oct. 8, 1991

[54] MULTI COMPONENT CATALYST AND A PROCESS FOR CATALYTIC CRACKING OF HEAVY HYDROCARBON FEED TO LIGHTER PRODUCTS

[75] Inventors: Joseph A. Herbst, Turnersville; Hartley Owen, Belle Mead, both of N.J.; Paul H. Schipper, Wilmington, Del.

[73] Assignee: Mobil Oil Corporation, Fairfax, Va.

[21] Appl. No.: 629,494

[22] Filed: Dec. 18, 1990

Related U.S. Application Data

[62] Division of Ser. No. 292,287, Dec. 30, 1988, Pat. No. 5,006,497.

[51] Int. Cl.$^5$ .............................................. C10G 11/05
[52] U.S. Cl. .................................... 208/120; 585/407; 585/739
[58] Field of Search ........................................ 208/120

[56] References Cited

U.S. PATENT DOCUMENTS

| 3,758,403 | 9/1973 | Rosinski et al. | 208/120 |
| 3,804,747 | 4/1974 | Kimberlin et al. | 208/120 |
| 4,834,867 | 5/1989 | Gilson | 208/120 |

FOREIGN PATENT DOCUMENTS 0054385  6/1982  European Pat. Off. .

Primary Examiner—Curtis R. Davis
Attorney, Agent, or Firm—Alexander J. McKillop; Charles J. Speciale; Richard D. Stone

[57] ABSTRACT

A catalytic cracking catalyst and process are disclosed using a catalyst containing: a matrix, a large pore molecular sieve, a shape selective paraffin cracking/isomerization zeolite and a shape selective aliphatic aromatization zeolite. An exemplary catalyst comprises dealuminized zeolite Y, optionally containing rare earth elements, HZSM-5, and gallium ZSM-5 in a matrix. The matrix contains and protects the relatively fragile zeolite components and acts as a sodium and metals sink. The large pore molecular sieve cracks large hydrocarbons to lighter paraffins and olefins. The shape selective paraffin cracking/isomerization component cracks/isomerizes the paraffins produced by the large pore molecular sieve. The shape selective aliphatic aromatization catalyst converts light paraffins and olefins into aromatics. A single shape selective zeolite, e.g., ZSM-5 with a controlled amount of an aromatization component such as gallium, may promote both paraffin cracking/isomerization and aromatization.

19 Claims, 1 Drawing Sheet

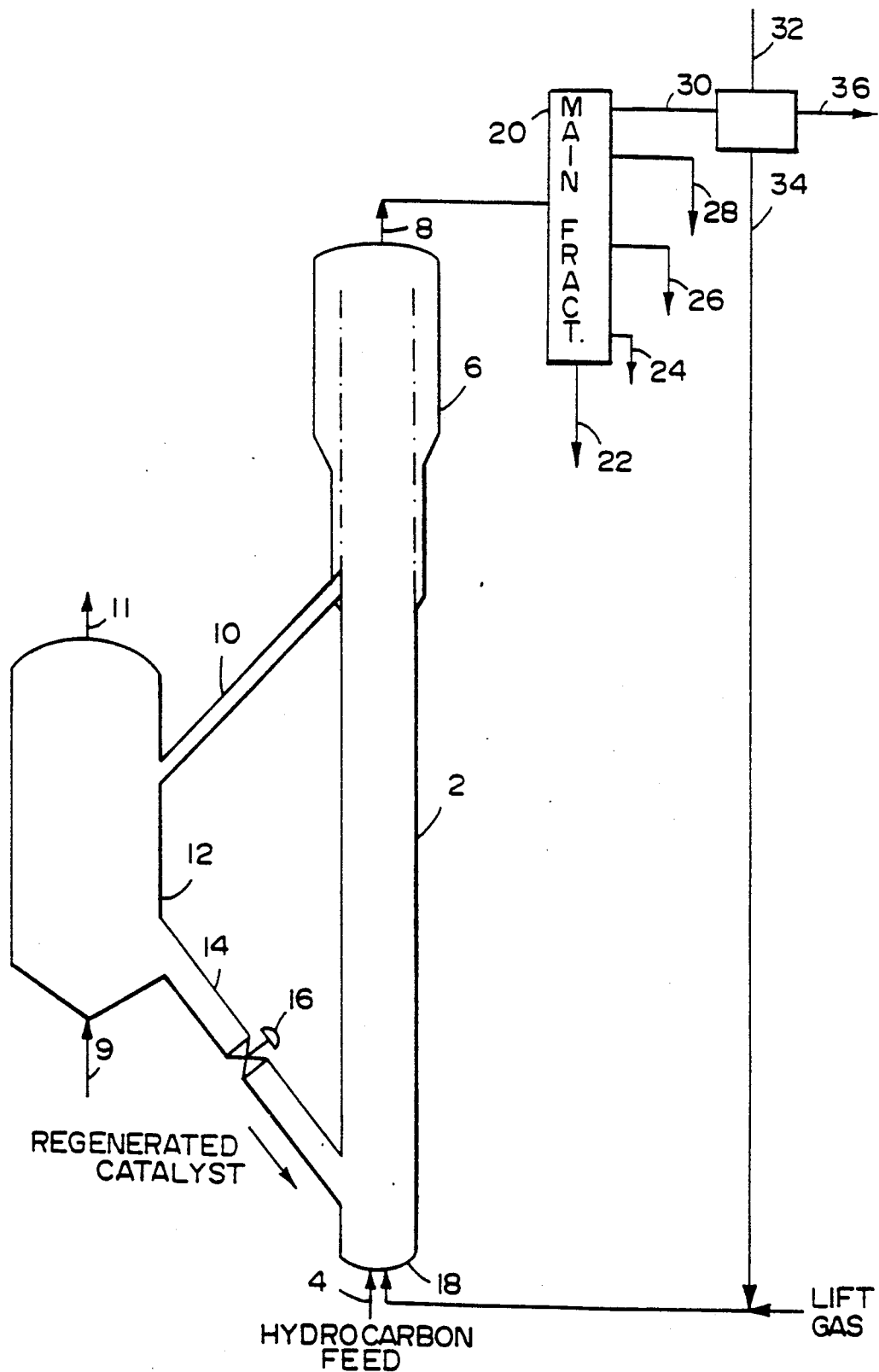

MULTI COMPONENT CATALYST AND A PROCESS FOR CATALYTIC CRACKING OF HEAVY HYDROCARBON FEED TO LIGHTER PRODUCTS

This is a division of copending application Ser. No. 292,287, filed Dec. 30, 1988, now U.S. Pat. No. 5,006,497.

FIELD OF THE INVENTION

This invention relates to catalytic cracking of heavy hydrocarbon oils to produce liquid hydrocarbons boiling in the gasoline and distillate range.

The present invention can best be understood in the context of its contribution to conventional FCC processes. Accordingly, a brief discussion of conventional cracking processes and catalysts follows.

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units, the hot regenerated catalyst is added to the feed at the base of a riser reactor. The fluidization of the solid catalyst particles may be promoted with a lift gas. Mixing and atomization of the feedstock may be promoted with steam, equal to 1-5 wt % of the hydrocarbon feed. Hot catalyst (650° C.+) from the regenerator is mixed with preheated (150°-375° C.) charge stock. The catalyst vaporizes and superheats the feed to the desired cracking temperature usually 450°-600° C. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products pass to product separation. Typically, the cracked hydrocarbon products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst rich solids portion of the settled product may be recycled to the reactor. The clarified slurry oil is a heavy product.

The "reactor vessel" into which the riser discharges primarily separates catalyst from cracked products and unreacted hydrocarbons and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537, 4,118,337, 4,118,338, 4,218,306 (Gross et al); 4,444,722 (Owen); 4,459,203 (Beech et al); 4,639,308 (Lee); 4,675,099, 4,681,743 (Skraba) as well as in Venuto et al, Fluid Catalytic Cracking With Zeolite Catalysts, Marcel Dekker, Inc. (1979). The entire contents of these patents and publication are incorporated herein by reference.

Conventional FCC catalysts usually contain finely divided acidic zeolites comprising e.g., faujasites, such as Rare Earth Y (REY), Dealuminized Y (DAY), Ultrastable Y (USY), Rare Earth containing Ultrastable Y (RE-USY), and Ultrahydrophobic Y (UHP-Y).

Typically, FCC catalysts are fine particles having particle diameters ranging from about 20 to 150 microns and an average diameter around 60-80 microns.

Catalyst for use in moving bed catalytic cracking units (e.g., TCC units) can be in the form of spheres, pills, beads, or extrudates, and can have a diameter ranging from 1 to 6 mm.

Although many advances have been made in both the catalytic cracking process, and in catalysts for use in the process, some problem areas remain.

The catalytic cracking process is excellent for converting heavy hydrocarbons to lighter hydrocarbons. Although this conversion is the whole reason for performing catalytic cracking, the boiling range of the cracked product is frequently not optimum for maximum profitability. Usually the gasoline and fuel oil boiling range fractions are the most valuable materials. Light olefins ($C_2$-$C_{10}$ olefins) are highly valuable only if a refiner has a way to convert these olefins into gasoline boiling range materials via e.g., alkylation, or these light olefins can be used for their petrochemical value. Light paraffins, $C_{10}^-$ materials, are generally not as valuable because of their relatively low octane. The very light paraffins, particularly propane, usually are not as valuable as gasoline. There are ever more stringent limitations on the allowable vapor pressure of gasoline, such that refiners can not blend as much light material into the gasoline as they would like to. Accordingly, there is great interest in converting "top of the barrel" components, or light hydrocarbons in the $C_{10}^-$ boiling range, into heavier products.

There is also a growing need in refineries to convert more of the "bottom of the barrel" or resid fractions into lighter components via catalytic cracking. Many FCC units today add 5-15 wt % resid, or non-distillable feed, to the catalytic cracking unit. Such heavy materials in the past were never considered as suitable feeds for catalytic cracking units, because of their high levels of Conradson Carbon, sodium, and dehydrogenation metals such as nickel and vanadium. The market for resids (bunker fuel oil, road asphalt) is so limited that refiners have turned to FCC as one way to upgrade the value of the resid fraction.

The most limiting factor in catalytic cracking of resids in conventional FCC units appears to be metals deposition on the catalyst. The nickel and vanadium in the resid deposit almost stoichiometrically on the FCC circulating catalyst inventory, leading to production of excessive amounts of "dry gas" during catalytic cracking. This problem can be ameliorated to some extent by adding metal passivators, such as antimony and/or tin, to passivate the nickel and vanadium components deposited on the catalyst due to processing of resid feed. Usually refiners are also forced to resort to very high levels of catalyst withdrawal and replacement, to maintain the metals levels on the catalyst at a tolerable level, and to maintain catalyst activity. This represents a large daily expense (for make-up catalyst) and presents a disposal problem because the spent catalyst has so much heavy metal on it.

Attempts have been made to modify catalytic cracking catalyst to accomodate heavy feeds. It is known that commercially available FCC catalysts with a high surface area, and an alumina rich matrix, are more resistant to deactivation from metals contamination than other FCC catalysts (Speronello, B. K. and Reagan, W. J., *Oil and Gas Journal*, Jan. 30, 1984, page 139). See also "Method Predicts Activity of Vanadium-Contaminated FCC Catalyst", E. L. Leuenberger, *Oil and Gas Journal*, July 15, 1985, page 125.

Another approach to metals passivation is disclosed in U.S. Pat. No. 4,372,841, incorporated herein by reference. Adding a hydrogen donor material to the reaction zone and passing catalyst through a reduction zone at high temperature at least partially passivates the catalyst.

Vanadium, when deposited on a catalyst, is fairly mobile and can migrate to zeolite sites, attack the zeolite and destroy it. This phenomenon was discussed in "Metals Resistant FCC Catalyst Gets Field Test," Jars, Dalen, *Oil and Gas Journal*, Sept. 20, 1982, Page 135.

Although catalyst manufacturers are working on catalysts which apparently can tolerate fairly high levels of metals, and thus permit conversion of more of the "bottom of the barrel" into light products, they have largely ignored the economically related problem of converting light materials, produced during cracking, into more valuable, heavier components.

We have discovered a multi component cracking catalyst, and a catalytic cracking process using this catalyst, which while potentially metals tolerant primarily affects significant changes in the product distribution from catalytic cracking. We have discovered a way to efficiently convert, in a catalytic cracking unit, the "bottom of the barrel" into more valuable products, and in a preferred embodiment also convert the relatively low value "top of the barrel" materials (incidentally produced during cracking) into more valuable products boiling in the gasoline range.

BRIEF SUMMARY OF THE INVENTION

Disclosed is a catalytic cracking catalyst comprising catalytically effective amounts of a large pore crystalline silicate and/or a large pore crystalline aluminophosphate and/or a large pore crystalline silicoaluminophosphate, all of which are referred to as large pore molecular sieves; a shape selective zeolite having a constraint index of 1-12, being substantially free of hydrogenation/dehydrogenation components and having paraffin cracking/isomerization activity; a shape selective zeolite having a constraint index of 1-12 and having paraffin aromatization activity; and a matrix.

In another embodiment, the present invention provides a process for catalytic cracking of a hydrocarbon feed boiling in the gas oil and heavier boiling range to lighter products by contact of the feed in a catalytic cracking reactor at catalytic cracking conditions with a cracking catalyst comprising catalytically effective amounts of large pore molecular sieves; a shape selective zeolite having a constraint index of 1-12 being substantially free of hydrogenation/dehydrogenation components and having paraffin cracking/isomerization activity; a shape selective zeolite having a constraint index of 1-12 and having paraffin aromatization activity; and a matrix;

BRIEF DESCRIPTION OF THE DRAWING

FIG. 1 is a schematic diagram of a conventional FCC reactor and regenerator.

DETAILED DESCRIPTION

FIG. 1, is a schematic flow diagram of an exemplary FCC unit. Feed is charged to the bottom of the riser reactor 2 via inlet 4. Hot regenerated catalyst is added via conduit 14, equipped with a flow control valve 16. A lift gas is introduced near the liquid and solid feed inlets via conduit 18. The riser reactor is an elongated, cylindrical smooth-walled tube.

The feed vaporizes and forms a dilute phase suspension with the FCC catalyst. The suspension passes up the riser, which generally gets wider to accomodate volumetric expansion. Cracked products and coked catalyst may pass into a solid-vapor separation means, such as a conventional cyclone. Preferably, the riser has a deflector and a short residence time stripper, as disclosed in U.S. Pat. No. 4,629,552 (Hadded and Owen) incorporated by reference. Another good design is the closed cyclone design disclosed in U.S. Pat. No. 4,749,471 (Kam et al) which is incorporated by reference. A means for stripping entrained hydrocarbons from the catalyst is usually provided in the base of vessel 6. Neither this stripping section, nor the solid-gas separation equipment is shown in the drawing for clarity. Such equipment is conventional. Cracked products are withdrawn from the reactor by conduit 8.

Stripped catalyst containing coke is withdrawn via conduit 10 and charged to regenerator 12. The catalyst is regenerated by contact with an oxygen-containing gas, usually air added via line 9. Flue gas is withdrawn from the regenerator by line 11.

Usually the feed temperature is about 150° C. to 375° C. The regenerator operates at about 650° C. to 750° C. and the catalyst to feed weight ratio is usually about 3:1 to 10:1, adjusted as necessary to hold a reactor outlet of about 450° C. to 550° C.

Cracked product from the FCC unit passes via line 8 to main fractionator 20, where product is separated into a heavy slurry oil stream 22, heavy distillate 24, light distillate 26, naphtha 28, and a light overhead stream 30, rich in C2-C4 olefins, C1-C4 saturates, and other light cracked gas components. This light stream is usually treated in an unsaturated gas plant 32 to recover various light gas streams, including C3-C4 LPG, and optionally $C_2^-$ fuel gas or the like. Preferably a light, $H_2$ rich gas stream is recycled from the gas plant via line 34 for use as all, or part, of a lift gas used to contact catalyst in the base of riser 2.

The catalyst and process of the present invention work very well in the conventional FCC units described above, and in TCC units. The maximum benefit from the present invention is achieved when a heavy, metals containing residual feed is at least part of the feed to the catalytic cracking unit.

FEEDS

Most FCC and TCC units crack gas oil or vacuum gas oil feeds, i.e., those having an initial boiling point above 400°–500° F., and an end boiling point above 750°–850° F.

The feed can include any wholly or partly non-distillable fraction, e.g. 1000° F.+ boiling range meterial. Resids, deasphalted resids, tar sands, shale oils, coal liquids and similar heavy material, may be used as part or all of the feed.

MULTI COMPONENT CATALYST

The catalysts used herein contain at least two different molecular seive components and a matrix component. Preferably, three different molecular sieves and a matrix are used for a total of four components. The catalyst components perform four different functions. We may refer to these catalysts hereafter as "quadro" catalysts. The quadro catalyst comprises:

1) A matrix
2) A large pore molecular sieve, preferably zeolite Y
3) A shape selective paraffin cracking/isomerization component, preferably HZSM-5
4) A shape selective aliphatic aromatization component, preferably GaZSM-5.

1. Matrix

The matrix can be conventional. The function of the matrix in catalytic cracking catalyst is well known. Briefly stated, it protects the relatively soft and fragile molecular seive components from physical damage. The matrix acts to some extent as a sodium and metals sink, and minimizes localized high temperatures when burning coke from the molecular sieve.

The matrix functions not only as described above but also can act as an efficient metals getter or sink. Metal getters, e.g., BaO, MgO, CaO, $La_2O_3$, $Ce_2O_3$ and similar alkaline and/or rare earth compounds may be present as part of the matrix, or as separate additives.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, molecular sieves materials have been incorporated into naturally occurring clays, e.g., bentonite and kaolin.

In addition to the foregoing materials, the zeolite or molecular sieve for use herein can be composited with a porous matrix material such as silica-alumina, silica-magnesium, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

2. Large Pore Cracking Component

The large-pore molecular sieve cracking component may be a conventional zeolite. Some of these, and patents describing their preparation are discussed hereinafter. Zeolite L, zeolite X, zeolite Y, and preferably higher silica forms of zeolite Y such as Dealuminized Y (DAY Y; U.S. Pat. No. 3,442,795); Ultrastable Y (USY; U.S. Pat. No. 3,449,070), Ultrahydrophobic Y (UHP-Y U.S. Pat. No. 4,331,694; U.S. Pat. No. 4,401,556), and similar materials are preferred for use herein. Zeolite beta (B, U.S. Pat. No. 3,308,069) or Zeolite L (U.S. Pat. No. 3,216,789; U.S. Pat. No. 4,544,539; U.S. Pat. No. 4,554,146 and U.S. Pat. No. 4,701,315) may also be used. These materials may be subjected to conventional treatments, such as impregnation or ion exchange with rare earths to increase stability. These patents are incorporated herein by reference.

These large-pore molecular sieves have a geometric pore opening of about 7 angstroms in diameter. In current commercial practice, most of the cracking of large molecules in the feed is done using these large pore molecular sieves.

Very Large Pore Cracking Component

In addition to the large-pore cracking components described above which have found extensive use commercially, several recently developed very large-pore cracking components may also be used. All of these materials have a geometric pore opening or portal greater than about 7 Angstroms in diameter.

VPI-5 is a molecular sieve with pore openings or portals larger than about 10 Angstrom units in diameter. It is an alumino-phosphate sieve with 18-membered rings of tetrahedrally-coordinated or T-atoms. They resemble the better known $AlPO_4$-5 materials. Such molecular sieves have very large pore volumes, and extremely large pore openings. Such large pore sieves would be very useful for cracking the very large molecules associated with high boiling or residual fractions. By contrast faujasites have portals containing 12 membered rings. VPI-5 was described by M. Davis, C. Saldarriaga, C. Montes, and J. Garces in a paper presented at "Innovations in Zeolite Materials Science" Meeting in Nieuwpoort, Belgium, Sept. 13–17, 1987. M. E. Davis, C. Saldarriaga, C. Montes, J. Garces and C. Crowder, Nature 331, 698 (1988).

Pillared, interlayered clays may also be used as a large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica are added to smectites to increase the interplatelet distances. U.S. Pat. No. 4,515,901 and U.S. Pat. No. 4,367,163 are incorporated herein by reference.

U.S. Pat. No. 4,757,041, which is incorporated herein by reference, discloses a class of pillared interlayered clay molecular sieves products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the large pore cracking component of the present invention.

Published European Application EP 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, such as SAPO-37, which have a three dimensional crystal framework of suitable size may also be used as the large pore cracking component. U.S. Pat. Nos. 4,440,871 and 4,741,892 and 4,689,138, which are incroporated herein by reference, disclose silicoaluminophosphate molecular sieves.

It should be emphasized that the process and catalyst of the present invention does not require the use of any single "large pore" cracking component. It is essential to have at least one cracking component, e.g., RE-USY, VPI-5, or pillared clay and mixtures thereof which has a geometric pore opening or portal in excess of about 7 Angstrom units in diameter.

The large pore component may comprise mixtures of one or more of the above materials, e.g., an equal mix of catalytically active forms of RE-USY, VPI-5 and a pillared clay.

Expressed as Constraint Index, CI, the large pore cracking component should have a CI of less than 1 and preferably less than 0.8. Details of the Constraint Index test procedures are provided in J. Catalysis 67, 218–222 (1981) and in U.S. Pat. No. 4,711,710 (Chen et al), both of which are incorporated herein by reference.

3. Paraffin Cracking/Isomerization

The shape selective paraffin cracking/isomerization component can be any shape selective zeolite which at the conditions experienced in a catalytic cracking unit promotes formation of olefinic and/or iso-olefinic materials. Any zeolite having a constraint index of 1–12 can be used herein but ZSM-5 is especially preferred. Details of the Constraint Index test procedures are provided in J. Catalysis 67, 218–222 (1981) and in U.S. Pat. No. 4,711,710 (Chen et al), both of which are incorporated herein by reference.

Preferred shape selective zeolites are exemplified by ZMS-5, ZSM-11, ZSM-12, ZSM-23, ZSM-35, ZSM-48, ZSM-57 and similar materials.

ZSM-5 is described in U.S. Pat. No. 3,702,886, U.S. Pat. No. 29,948 and in U.S. Pat. No. 4,061,724 (describing a high silica ZSM-5 as "silicalite").

ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-57 is described in U.S. Pat. No. 4,046,859.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such catalysts include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ratio of 70/1, 100/1, 500/1 or even higher.

Preferably the shape selective paraffin cracking/isomerization zeolite is placed in the hydrogen form by conventional means, such as exchange with ammonia and subsequent calcination. The zeolite may be used in any form which promotes paraffin upgrading.

4. Aromatization Component

The preferred, but optional, shape selective aromatization component can be any zeolite having a constraint index of 1–12 and additional components which promote paraffin aromatization at catalytic cracking conditions.

Gallium ZSM-5 is especially preferred for use herein because of its ability to convert light paraffins such as propanes and butanes into aromatic hydrocarbons which are valuable as petrochemicals or as high octane gasoline blending components. Gallium may be incorporated into the zeolite framework during synthesis or it may be exchanged or impregnated or otherwise incorporated into the ZSM-5 after synthesis. Preferably 0.05 to 10 and most preferably 0.1 to 2.0 wt % gallium is associated with the aromatization zeolite.

It is possible, and preferred, to use the same shape selective zeolite for both paraffin cracking/isomerization and for aromatization. Control of the acidity of the zeolite (alpha value) and of the nature and amount of the additional components which promote aromatization permits this. Partial exchange of HZSM-5 with gallium is one way to do this.

In this case, the ZSM-5 would preferably contain 0.05 to 1.0 wt % gallium. The reduced gallium content allows both paraffin cracking/isomerization and aromatization to occur.

Preferably the three zeolite or molecular sieve components (large pore, paraffin cracking/isomerization and aromatization zeolites) comprise 5–90 wt. % of the finished catalyst, with the remainder being matrix. On a matrix free basis, the relative ratios of the three zeolites can vary greatly, depending on feedstocks, products desired, and to a lesser extent on catalytic cracking conditions.

In general, the function of the large pore cracking component is bulk conversion of heavy feed to lighter materials, including light paraffins and light olefins in the $C_2$–$C_{10}$ range.

The light paraffins are not preferred products. The $C_5{}^+$ paraffins tend to be relatively low in octane number. They can be upgraded by conventional means such as platinum reforming, but this increases costs. There is a significant yield loss during reforming, and reliance on reforming tends to increase the aromatics content of the gasoline pool.

The shape selective zeolite cracking/isomerization catalyst converts a significant portion of these paraffins to olefins and iso-olefins, with much higher octane number, in the case of the $C_5^+$ olefins, and much more reactivity in the case of the $C_4^-$ olefins.

The light olefins produced by the shape selective cracking/isomerization catalyst and by the large pore cracking catalyst can be easily upgraded in conventional alkylation units. In addition, the iso-olefins can be processed in etherification units to high octane oxygenates such as MTBE or TAME. By increasing the amount of shape selective cracking/isomerization component present in the quadro catalyst, it is possible to enhance the production of $C_2$-$C_{10}$ olefins and, via subsequent alkylation or etherification steps, increase gasoline yields and octane number, with aliphatic components rather than aromatic components.

The shape selective aromatization zeolite converts $C_{10}^-$ paraffins, and especially $C_4^-$ paraffins, to aromatics. The aromatics produced, primarily benzene, toluene, and xylene (BTX) are extremely valuable both as petrochemicals or as high octane gasoline blending components.

CATALYST MANUFACTURE

The quadro catalyst can be made using conventional techniques for mixing molecular sieves and matrix materials.

The different zeolite or molecular sieve components can be dry blended or wet ball milled together, and then added to a suitable matrix, e.g., a silica-alumina gel, clay composite or an alumina-clay composite and further mixed. The matrix and zeolite mixture can be extruded, pilled, marumerized, dropped in an oil bath, etc. to form relatively large particles. For use in fluidized bed catalytic cracking units the matrix-zeolite mixture is preferably spray dried, but any other means can be used to make fluidizable catalyst particles, such as crushing or grinding larger size extrudates or pills.

It is preferred to have the crystalline zeolite or molecular sieve component in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria silica-beryllia, silica-titania, as well as ternary combinations such as silica-alumina-magnesia, silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in matrix formulation.

Preferably the conventional, large pore cracking component is present in an amount roughly equal to four times the combined amount of shape selective paraffin cracking/isomerization zeolite and shape selective paraffin aromatization zeolite. Thus, catalyst containing 80 wt. % RE-USY zeolite, 10 wt. % HZSM-5 and 10 wt. % GaZSM-5 (all on a matrix free basis) will give very good results. Expressed as weight percent of total catalyst, the quadro catalyst would have the following composition when the quadro catalyst contains 50 wt. % total zeolite:

1) Matrix—50 wt. %
2) Large pore molecular sieve—40 wt. %
3) HZSM-5—5 wt. %
4) GaZSM-5—5 wt. %

Preferably the catalyst contains the following amounts of zeolite in a matrix.

| Component | Preferred Range | Most Preferred Range |
|---|---|---|
| Large pore molecular Sieve | 5–50 wt % | 10–45 wt % |
| Paraffin cracking/ Isomeration zeolite | 0.1–20 wt % | 0.5–5 wt % |
| Aromatization Zeolite | 0.1–20 wt % | 0.5–5 wt % |

EXAMPLES OF CATALYST PREPARATION

Example 1

This example describes how to prepare a preferred quadro catalyst. 2400 gms of Davison Z-14US, 300 gms of NH$_4$ZSM-5, 300 gms of GaZSM-5 (all weights on ignited basis), each in form of a roughly 30% ballmilled slurry containing deagglomerated particles (95% L.T. 5 microns), are added together with 1304, gms of 50% aluminum chlorhydrol (23% Al$_2$O$_3$, 8% Cl, Reheis Co.) and 2700 gms of Kaolin clay (ignited basis, Georgia Kaolin) in a 15 gallon Nalgene container containing 5996 gms of DI water. The mixture is subjected to high shear conditions using a Cowles Dissolver (Morehouse Industries, Fullerton, CA) equipped with 6.5" blade turning at 700–800 rpm for 30 minutes to prepare a pre spray-dryer slurry. The solids content of the slurry is adjusted between 25–40% using additional DI water, as necessary. Also, the slurry pH is adjusted between 4.0–4.6 using 20% H$_2$SO$_4$ or 50% NH$_4$OH, as necessary. The slurry is then spray-dried at 370° F. outlet temperature. The spray dryer (Komline-Sanderson; Peapack, NJ) is operated at 5.5 psig air pressure with 0.03" nozzle at 250 cc/minute feed rate using a Moyno feed pump (Springfiled, OH). The spray dried particles are air calcined for 2 hours at 1000° F. in flowing air. Subsequently, the catalyst is first column exchanged with 1.0N NH$_4$NO$_3$ solution followed by a slurry exchange using a solution containing 1.5 wt. % rare earth chlorides (prepared from 60% AR Solution, Code 1443, Davison Speciality Chemicals). Both exchanges are carried out @5/1 solution/catalyst weight ratio. The catalyst is next washed chloride free and then dried at 250° F. overnight before use. The nominal catalyst composition is 40% RE-USY (Z-14US), 5% HZSM-5, 5% GaZSM-5 and 50% matrix (10% alumina binder, 90% clay).

Illustrative Embodiment: Catalytic Cracking

The following illustrative embodiment does not represent an actual experiment. It is an estimate, but one based on much other experimental work.

The illustrative embodiment is an estimate of the yields obtainable in a conventional FCC unit charging the same feed, at the same conditions, and changing only the catalyst compositions.

I. (Prior Art) The conventional catalyst represents a conventional large pore zeolite based cracking catalyst in a matrix. No ZSM-5 is present.

II. (Prior Art) Represents a conventional cracking catalyst plus 2.0 wt % HZSM-5.

III. (Invention) Represents yields obtainable from a quadro catalyst, i.e., one containing 1.0 wt. % GaZSM-5 and 1.0 wt. % HZSM-5. The GaZSM-5 and HZSM-5 are present in equimolar amounts. The GaZSM-5 contains 1 wt % Ga in the ZSM-5 framework.

IV. Represents a quadro catalyst with the GaZSM-5 and HZSM-5 present in a separate particle, encapsulated in an alumina matrix.

|  | Conv. (No ZSM-5) I | Conv. + ZSM-5 II | Conv. & GaZSM-5 & ZSM-5 III | Con. & GaZSM/ ZSM-5 & Alumina Matrix IV |
|---|---|---|---|---|
| % of FF |  |  |  |  |
| Gasoline | 51.1 | 49.5 | 49.7 | 49.7 |
| Paraffins | 22.7 | 21 | 21 | 21 |
| Olefins |  |  |  |  |
| $C_6^-$ | 3.8 | 4.5 | 4.0 | 4.0 |
| $C_7^+$ | 10.6 | 10.0 | 10.0 | 10.0 |
| Aromatics | 8.5 | 8.5 | 9.2 | 9.2 |
| Naphthenes | 5.5 | 5.5 | 5.5 | 5.5 |
| LCO | 16 | 16 | 16 | 16.8 |
| HCO | 8 | 8.0 | 8 | 7.2 |
| $C_3^= + C_4^=$ | 8.7 | 10.3 | 10.1 | 10.1 |
| $C_2^-$ | 3.5 | 3.5 | 3.5 | 3.5 |
| Gasoline Composition |  |  |  |  |
| Paraffins | 44.5 | 42.5 | 42.5 | 42.5 |
| Olefins | 28.0 | 29.5 | 28 | 28 |
| Naphthenes | 11 | 11 | 11 | 11 |
| Aromatics | 16.5 | 17 | 18.5 | 18.5 |
| Gasoline Octane No. |  |  |  |  |
| Research Clear | 92.6 | 93.6 | 94.0 | 94.0 |

It can be seen from the above illustrative embodiment that the quadro catalyst of the invention (III) increases gasoline octane number as compared to prior art catalysts (I and II) and increases gasoline yield as compared to prior art methods of adding ZSM-5 (II).

Although these illustrative embodiments were based on use of a gas oil feed, the catalyst and process are especially suited to upgrading heavier feeds, such as those containing atmospheric resids or vacuum resids.

What is claimed:

1. A process for catalytic cracking a feed of hydrocarbons boiling in the gas oil range and heavier to lighter products by contacting the feed at catalytic cracking conditions with a cracking catalyst comprising catalytically effective amounts of:
   (i) a large pore molecular sieve;
   (ii) a shape selective zeolite having a constraint index of 1-12, being substantially free of hydrogenation/dehydrogenation components and having paraffin cracking/isomerization activity;
   (iii) a shape selective zeolite having a constraint index of 1-12 and paraffin aromatization activity; and
   (iv) a matrix.

2. The process of claim 1 wherein the feed comprises a residual feed.

3. The process of claim 1 wherein the catalyst comprises:
   (i) 5-50 wt % of a large pore zeolite selected from the group of the group of zeolite Y, dealuminized Y, ultrastable Y, ultrahydrophobic Y, VPI-5, pillared clay, SAPO-37 and zeolite Beta;
   (ii) 0.1-20 wt % of HZSM-5;
   (iii) 0.1-20 wt % GaZSM-5;
   (iv) a matrix.

4. The process of claim 1 wherein the large pore molecular sieve has a portal comprising at least 12 membered rings.

5. The process of claim 1 wherein the large pore molecular sieve comprises at least one member selected from the group of zeolite Y, dealuminized Y, ultrastable Y and ultrahydrophobic Y.

6. The process of claim 1 wherein the large pore molecular sieve comprises at least one member selected from the group of VPI-5, pillared clays, SAPO-37 and zeolite Beta.

7. The process of claim 6 wherein the large pore molecular sieve contains rare earth elements.

8. The process of claim 1 wherein at least one of the shape selective zeolites having a constraint index of 1-12 is selected from the group of ZSM-5, ZSM-11, ZSM-22, ZSM-23, ZSM-35 and ZSM-57.

9. The process of claim 8 wherein the shape selective zeolite having paraffin cracking/isomerization activity is selected from the group of ZSM-5 and ZSM-11.

10. The process of claim 1 wherein the shape selective zeolite having paraffin cracking/isomerization activity is in the hydrogen form.

11. The process of claim 1 wherein the paraffin aromatization zeolite and the paraffin cracking/isomerization zeolite are the same shape selective zeolite, and the zeolite contains 0.05 to 1.0 wt. % aromatization component.

12. The process of claim 11 wherein the shape selective zeolite contains 0.05 to 1.0 wt. % gallium.

13. The process of claim 1 wherein the paraffin cracking/isomerization zeolite is HZSM-5.

14. The process of claim 1 wherein the aromatization zeolite is gallium ZSM-5.

15. The process of claim 1 wherein the matrix, exclusive of zeolites, comprises at least 7 wt. % alumina.

16. The process of claim 1 wherein the matrix, exclusive of zeolites, contains about 0.5 to 10 wt. % of at least one of calcium, magnesium, barium, lanthanum, cerium and compounds thereof.

17. The process of claim 1 wherein the catalyst comprises:
   (i) 5-50 wt. % large pore molecular sieve;
   (ii) 0.1-20 wt. % shape selective zeolite having paraffin cracking/isomerization activity;
   (iii) 0.1-20 wt. % shape selective zeolite having aromatization activity; in
   (iv) a matrix.

18. The process of claim 1 wherein the catalyst comprises:
   (i) 10-45 wt. % large pore molecular sieve;
   (ii) 0.5-5 wt. % paraffin cracking/isomerization zeolite;
   (iii) 0.5-5 wt. % aromatization zeolite; in
   (iv) a matrix.

19. The process of claim 1 wherein the catalyst comprises:
   (i) 10-45 wt. % percent zeolite Y which has been at least partially dealuminized;
   (ii) 0.2-5 wt. % ZSM-5; at least a portion of which is in the hydrogen form, and a portion of which contains gallium, and the gallium content is equal to 0.05 to 1.0 wt. % of the total ZSM-5 content.

* * * * *